United States Patent [19]

Chiba

[11] Patent Number: 5,643,504
[45] Date of Patent: Jul. 1, 1997

[54] METHOD OF MAKING A COMPOSITE GLASS AND RESIN OPTICAL ELEMENT WITH AN ASPHERIC SURFACE

[75] Inventor: Toru Chiba, Tokyo, Japan

[73] Assignee: Asahi Kogaku Kogyo Kabushiki Kaisha, Tokyo, Japan

[21] Appl. No.: 355,006

[22] Filed: Dec. 13, 1994

Related U.S. Application Data

[62] Division of Ser. No. 885,606, May 19, 1992, Pat. No. 5,400,182.

[30] Foreign Application Priority Data

May 21, 1991 [JP] Japan ................................ 3-145599
Jul. 19, 1991 [JP] Japan ................................ 3-203483

[51] Int. Cl.$^6$ ........................................................ B29D 11/00
[52] U.S. Cl. ............................ 264/1.7; 264/1.38; 156/99
[58] Field of Search .............................. 264/1.7, 1.38, 264/1.8; 351/159, 163, 166, 167; 156/99

[56] References Cited

U.S. PATENT DOCUMENTS

| | | | |
|---|---|---|---|
| 3,917,766 | 11/1975 | Howden | 359/708 X |
| 4,227,950 | 10/1980 | Spycher | 264/1.7 |
| 4,319,945 | 3/1982 | Howden . | |
| 4,432,832 | 2/1984 | Fantone . | |
| 4,657,354 | 4/1987 | Kobayashi | 359/718 |
| 4,683,153 | 7/1987 | Goepfert et al. | 359/900 |
| 4,738,516 | 4/1988 | Verhoeven et al. | 359/718 |
| 4,758,074 | 7/1988 | Yamakawa | 359/708 |
| 4,948,447 | 8/1990 | Clarke et al. | 264/1.7 |
| 4,957,663 | 9/1990 | Zwiers et al. | 264/1.7 |
| 5,116,684 | 5/1992 | Fretz, Jr. et al. | 264/1.7 |
| 5,343,260 | 8/1994 | Henry et al. | 264/1.7 |

FOREIGN PATENT DOCUMENTS

| | | |
|---|---|---|
| 63-110410 | 5/1988 | Japan . |
| 63-225557 | 9/1988 | Japan . |
| 1147401 | 6/1993 | Japan . |

OTHER PUBLICATIONS

*Minolta Techon Report*, "Compound Aspheric Lens", No. 2, 1985.

*Primary Examiner*—Mathieu D. Vargot
*Attorney, Agent, or Firm*—Sughrue, Mion, Zinn, Macpeak & Seas

[57] ABSTRACT

In order to provide an optical element with an aspheric surface, as well as a process by which the optical element can be mass-produced with high efficiency and consistent precision, the improved optical element with an aspheric surface includes a glass substrate and an overlying light-transmissive resin layer worked to have an aspheric surface. This optical element can be produced by molding a light-transmissive resin composition as it is cured between a glass substrate and a mold having an aspheric surfaced shape. The preferred light-transmissive resin has a Rockwell hardness of 40–80 on the M scale at –40° C. to 60° C.

6 Claims, 1 Drawing Sheet

METHOD OF MAKING A COMPOSITE GLASS AND RESIN OPTICAL ELEMENT WITH AN ASPHERIC SURFACE

This is a divisional of application Ser. No. 07/885,606 filed May 19, 1992, now U.S. Pat. No. 5,400,102.

BACKGROUND OF THE INVENTION

This application is based on and claims priority from Japanese Patent Applications No. Hei 3-145599 filed May 21, 1991 and No. Hei 3-203483 filed Jul. 19, 1991, the disclosures of which are incorporated by reference herein.

The present invention relates to an optical element with an aspheric surface and a process for producing the same.

Optical elements with an aspheric surface such as aspheric lenses have been proposed for correcting the aberrations that will develop in spherical lenses and, hence, they are used as eyepieces and high photographic lenses. Lenses are manufactured from glass or plastics and in order to work glass to have an aspheric surface, grinding and polishing operations are necessary for each lens. Hence, aspheric glass lenses have the disadvantage of being unsuitable for large-scale production and having only limited consistency in the precision of lens machining. Under these circumstances, aspheric glass lenses find utility only in specialty optical elements. In contrast, aspheric plastic lenses can be shaped with molds and hence are highly suitable for large-scale production. However, they do not have high heat and dimensional stability and can only be used in applications that do not require very high precision.

SUMMARY OF THE INVENTION

An object of the present invention is to provide an optical element with an aspheric surface of high precision that is improved in both thermal and dimensional stability.

Another object of the present invention is to provide a process by which optical elements with an aspheric surface of the type described above can be mass-produced with high efficiency and consistent precision.

These and other objects of the present invention can be achieved not only by using a glass substrate having high heat and dimensional stability but also by composing this glass substrate with an optical resin in such a way that the aspheric surface of the resin is molded to become integral with the glass substrate.

In its first aspect, the present invention provides an optical element with an aspheric surface that comprises a glass substrate and an overlying light-transmissive resin layer worked to have an aspheric surface.

In its second aspect, the present invention provides a process for producing an optical element with an aspheric surface that comprises molding a light-transmissive resin composition as it is curved between a glass substrate and a mold having an aspheric surfaced shape.

DESCRIPTION OF THE PREFERRED EMBODIMENTS

Figure 1:
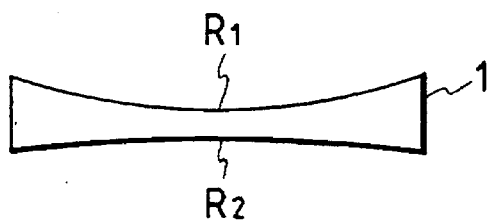
FIG. 1 is a side view of a spherical glass lens.

In the present invention, it is preferred that the glass substrate has been preliminarily worked to have a spherical surface. In other words, the aspheric surface that is to correct the aberrations that will develop in the glass substrate which is preliminarily worked to have a spherical surface is preferably formed of a light-transmissive resin layer. It should, however, be noted that the present invention is by no means limited to this particular embodiment.

An known thermosetting or uv curable resin can be used as the light-transmissive resin and they may be exemplified by epoxy resins, acrylate resins, methacrylate resins, styrene resins, urethane resins and polyethylene glycol derivated resins. Compared to uv curable resins, thermosetting resins have a very good balance in the transmittance of visible light, are stable in transmittance, refractive index and dispersion, permit uniform thermal polymerization and are capable of forming thick layers consistently. Further, thermosetting resins absorb less ultraviolet radiation and hence are resistant to yellowing. In addition, thermosetting resins have no limitations on the material of which the substrate glass can be made. Because of these and many other advantages of thermosetting resins, suitable resin materials are preferably selected in consideration of various factors such as the object of use of the optical element with an aspheric surface to be manufactured and the thickness of the resin layer.

While the light-transmissive resin layer can be formed of various types of resins as described above, preferred resin layers are such that they are capable of deforming by themselves to absorb the stress that will develop upon joining with the glass substrate, that will inherently produce a small stress upon joining, that will shrink by a small amount upon curing and that have a small coefficient of thermal expansion. Further, in consideration of the need to form an anti-reflection coat over the light-transmissive resin layer by evaporation of an inorganic material, it is preferred to select a suitable resin material from among those which will deform thermally at temperatures of 100° C. and above.

Among the resin materials that satisfy the conditions described above, epoxy resins are particularly preferred. Advantageous epoxy resins are those of bisphenol A type, bisphenol AD type and bisphenol F type, which are cured with an acid anhydride, an amine or any other curing agents. Acid anhydrides that can be used as curing agents include hexahydrophthalic anhydride and methyl hexahydrophthalic anhydride, and amines that can be used as curing agents include aliphatic polyamines, polyaminoamides, aromatic diamines, alicyclic diamines and imidazoles. Other curing agents that can be used include phenolic resins, amino resins, mercaptan compounds, dicyanodiamides and Lewis acid complex compounds.

It is particularly preferred that the resin layer in the optical element with an aspheric surface in accordance with the present invention has a Rockwell hardness of 40–80 on the M scale at –40° C. to 60° C. If its Rockwell hardness on the M scale is less than 40, the resin layer is undesirably soft and it is not only poor in chemical resistance but also low in thermal deformation temperature, thus making it difficult to form an anti-reflection coat by evaporation of an inorganic material. If the Rockwell hardness on the M scale exceeds 80, the resin layer is so hard that it will either separate from the substrate glass or destroy it upon application of stress.

To produce an optical element with an aspheric surface according to the present invention, a light-transmissive resin composition is molded as it is cured between the glass substrate described above and a mold having an aspheric surfaced shape. The light-transmissive resin composition is a feed composition that is capable of forming a light-transmissive resin and contains not only a resin component such as the monomer, oligomer or a curing agent that is necessary for each production but also additives such as a solvent, a polymerization initiator and an antioxidant.

The light-transmissive resin layer may be formed directly on the glass substrate to produce a composite optical element with an aspheric surface that has good adhesion between the substrate and the resin layer. The adhesion between the two members can be further enhanced by preliminarily forming a layer of silane coupling agent on the glass substrate. Any known silane coupling agent may be used and examples include silane compounds such as γ-glycidoxytrimethoxysilane, γ-glycidoxypropyltrimethoxysilane, γ-glycidoxypropyltriethoxysilane, γ-glycidoxypropyldimethoxysilane, β-(3,4-epoxycyclohexyl)ethyltrimethoxysilane, γ-methacryloxypropyltrimethoxysilane, and γ-methacryloxypropylmethyl-dimethoxysilane, as well as the products of their hydrolysis. These silane coupling agents may be used either on their own or as admixtures.

The present invention is described below more specifically with reference to the accompanying drawings. FIG. 1 is a side view of a glass lens 1 worked to have a spherical surface on both sides; the surface on one side has a radius of curvature of $R_1$ and the surface on the other side has a radius of curvature of $R_2$.

Figure 2:
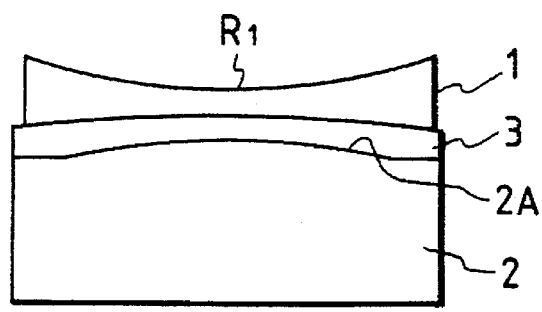
FIG. 2 is a diagram showing how an aspheric lens is produced by the process of the present invention.
Figure 3:
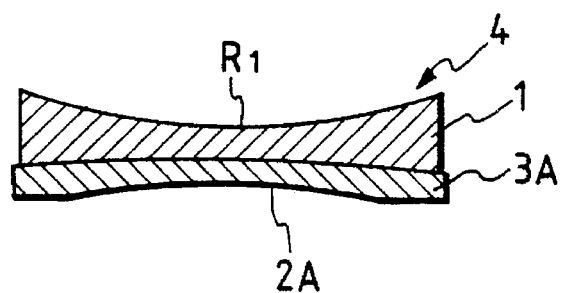
FIG. 3 is a cross-sectional view of the aspheric lens of the present invention.

To provide an aspheric surface on the side of glass lens 1 which has the curvature radius of $R_2$, a mold 2 is provided that has a desired aspheric molding surface 2A as shown in FIG. 2. Then, a light-transmissive resin composition 3 is placed on the side of glass lens 1 which has the curvature radius of $R_2$, brought into registry with the aspheric surface 2A of the mold 2 and polymerized to cure, thereby forming a light-transmissive resin layer 3A. Subsequently, the assembly is taken out of the mold to give a composite aspheric lens 4 which, as shown in FIG. 3, has an aspheric surface 2A made integral with the spherical glass lens 1.

The drawings show the case where an aspheric surface is provided on a concave side of the glass lens. If one wants to provide an aspheric surface on a convex side of the glass lens, he may place the light-transmissive resin composition on a mold having a corresponding aspheric (concave) surface and the glass lens is then placed on that concave surface, followed by polymerization and curing of the light-transmissive resin composition.

Examples of the Invention

The following examples are provided for the purpose of further illustrating the present invention but are in no way to be taken as limiting. In the examples, a spherical glass lens made of BK7 was used as a substrate; it had a diameter of 20 mm, with $R_1=28$ mm and $R_2=55$ mm, and its thickness was 3 mm in the center.

Example 1

A hundred parts by weight of a silane coupling agent (γ-glycidoxypropyltrimethoxysilane) and 30 parts by weight of 0.1 N HCl were mixed and hydrolyzed for 8 h. The resulting hydrolyzate was coated on the side of the spherical glass lens having the curvature radius $R_2$ and subsequently dried at 120° C. for 1 h to form a layer of silane coupling agent. In the next place, a resin composition containing 100 parts by weight of EPIKOTE 828 (the trade name of a bisphenol A type epoxy resin produced by Yuka-Shell Epoxy Co., Ltd.) and 70 parts by weight of hexahydrophthalic anhydride (curing agent) was metered in a given amount and dripped on the layer of silane coupling agent. The resin coating was then brought into registry with a separately prepared mold (26 mmφ) having an aspheric surface and heated at 100° C. for 2 h so that it would cure to form a resin layer having a central thickness of 50 μm and a maximum resin thickness of 250 μm, whereby a composite aspheric lens was produced.

Example 2

A hundred parts by weight of γ-glycidoxypropyltriethoxysilane and 30 parts by weight of 0.1 N HCl were mixed and hydrolyzed for 8 h. The resulting hydrolyzate was coated on the side of the spherical glass lens having the curvature radius $R_2$ and subsequently dried at 120° C. for 1 h to form a layer of silane coupling agent. In the next place, a resin composition containing 100 parts by weight of EPIKOTE 828 (the trade name of a bisphenol A type epoxy resin produced by Yuka-Shell Epoxy Co., Ltd.) and 90 parts by weight of methyl hexahyrophthalic anhydride (curing agent) was metered in a given amount and dripped on the layer of silane coupling agent. The resin coating was then brought into registry with a separately prepared mold (26 mmφ) having an aspheric surface and heated first at 60° C. for 1 h, then at 120° C. for 2 h so that it would cure to form a resin layer having a central thickness of 100 μm and a maximum resin thickness of 600 μm, whereby a composite aspheric lens was produced.

Example 3

A hundred parts by weight of γ-glycidoxypropyltriethoxysilane and 30 parts by weight of 0.1 HCl were mixed and the mixture was hydrolyzed with stirring for 8 h. The resulting hydrolyzate was coated on the side of the spherical glass lens having the curvature radius $R_2$ and subsequently dried at 120° C. for 2 h to form a layer of silane coupling agent. In the next place, a resin composition containing 100 parts by weight of ECOBOND 45 CLEAR (the trade name of an epoxy resin produced by Grace Japan K.K) and 100 parts by weight of ECOBOND 15 CLEAR (the trade name of a polyamine based curing agent produced by Grace Japan K.K.) was metered in a given amount and dripped on the layer of silane coupling agent. The resin coating was then brought into registry with a separately prepared mold (26 mmφ) having an aspheric surface, polymerized at 25° C. for 8 h so that it would cure to form a resin layer having a central thickness of 100 μm and a maximum resin thickness of 600 μm, whereby a composite aspheric lens was produced.

Comparative Example 1

A hundred parts by weight of γ-glycidoxyproplyltriethoxysilane and 30 parts by weight of 0.1 N HCl were mixed and the mixture was hydrolyzed with stirring for 8 h. The resulting hydrolyzate was coated on the side of the spherical glass lens having the curvature radius $R_2$ and subsequently dried at 120° C. for 1 h to form a layer of silane coupling agent. In the next place, 50 parts by weight of methoxytetraethylene glycol methacrylate, 50 parts by weight of methoxypolyethylene glycol 400 methacrylate and 2 parts by weight of diethoxyacetophenone (photopolymerization initiator) were mixed and dripped on the layer of silane coupling agent. The resin coating was brought into registry with a separately prepared mold (26 mmφ) having an aspheric surface and exposed to a uv radiation (360 nm) at an intensity of 100 mJ/cm² so that it would cure to form a resin layer having a central thickness of 50 μm and a maximum resin thickness of 250 μm, whereby a composite aspheric lens was produced.

Comparative Example 2

A hundred parts by weight of γ-glycidoxytrimethoxysilane and 30 parts by weight of 0.1 N HCl were mixed and the mixture was hydrolyzed with stirring for 8 h. The resulting hydrolyzate was coated on the side of the spherical glass lens having the curvature radius $R_2$ and subsequently dried at 120° C. for 2 h to form a layer of silane coupling agent. In the next place, a resin composition having 100 parts by weight of methyl methacrylate mixed with 0.5 part by weight of benzoyl peroxide was metered in a given amount and dripped on the layer of silane coupling agent. The resin coating was then brought into registry with a separately prepared mold (26 mmφ) having an aspheric surface, polymerized at 25° C. for 8 h so that it would cure to form a resin layer having a central thickness of 100 μm and a maximum resin thickness of 600 μm, whereby a composite aspheric lens was produced.

Tests

Rockwell hardness

The resins used in Examples 1–3 and Comparative Examples 1 and 2 were shaped into test specimens in disk form that were ca. 5–10 mm thick and which had a diameter of ca. 20 mm. The Rockwell hardness of each specimen on the M scale was measured and the results are shown in Table 1 below.

Heat cycle test

Ten samples were prepared for each of the composite aspheric lenses fabricated in Examples 1–3 and Comparative Examples 1 and 2 and they were subjected to five heat cycles each consisting of cooling at −40° C. for 20 min, holding at room temperature for 10 min and heating at 60° C. for 20 min. Thereafter, the samples were visually checked for the separation of the resin layer, as well as for the breakage of lens. The results are also shown in Table 1.

TABLE 1

| Run No. | Rockwell hardness | | | Evaluation of composite aspheric lens | |
|---|---|---|---|---|---|
| | −40° C. | 20° C. | 60° C. | Separation of resin layer | Breakage of lens |
| Example | | | | | |
| 1 | 80 | 78 | 75 | none | none |
| 2 | 79 | 70 | 67 | none | none |
| 3 | 75 | 69 | 64 | none | none |

TABLE 1-continued

| Run No. | Rockwell hardness | | | Evaluation of composite aspheric lens | |
|---|---|---|---|---|---|
| | −40° C. | 20° C. | 60° C. | Separation of resin layer | Breakage of lens |
| Comparative Example | | | | | |
| 1 | 92 | 90 | 85 | separation occurred in several samples | none |
| 2 | 93 | 90 | 85 | separation occurred in all samples | breakage occurred in all samples |

In accordance with the present invention, optical elements with an aspheric surface of high precision that are improved in both thermal and dimensional stability can be mass-produced with high efficiency and consistent precision. Resins that are selected to have a hardness in the specified range are capable of absorbing by themselves the stress that develops upon either thermal deformation or polymerization shrinkage; therefore, the optical elements with an aspheric surface that are produced by the present invention have extremely high thermal and dimensional stability.

What is claimed is:

1. A process for producing an optical element with an aspheric surface that comprises molding a light-transmissive resin composition as it is cured between a glass substrate and a mold having an aspheric surfaced shape, and the resin will, upon curing, develop a Rockwell hardness of 40–80 on the M scale at −40° C. to 60° C.

2. The process according to claim 1 wherein the glass substrate has been worked to have a spherical surface.

3. The process according to claim 1 wherein the resin is a uv curable resin or a thermosetting resin.

4. The process according to claim 1 wherein a layer of silane coupling agent is preliminarily provided on the surface of the glass substrate where a resin layer with an aspheric surface is to be formed.

5. The process according to claim 2 wherein a layer of silane coupling agent is preliminarily provided on the surface of the glass substrate where a resin layer with an aspheric surface is to be formed.

6. The process according to claim 3 wherein a layer of silane coupling agent is preliminarily provided on the surface of the glass substrate where a resin layer with an aspheric surface is to be formed.

* * * * *